United States Patent
Gordon et al.

(10) Patent No.: US 12,142,142 B2
(45) Date of Patent: Nov. 12, 2024

(54) TRAFFIC FLOW RISK PREDICTION AND MITIGATION

(71) Applicant: GM GLOBAL TECHNOLOGY OPERATIONS LLC, Detroit, MI (US)

(72) Inventors: Richard Gordon, Canton, MI (US); Donald K Grimm, Utica, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 372 days.

(21) Appl. No.: 17/448,909

(22) Filed: Sep. 27, 2021

(65) Prior Publication Data

US 2023/0095539 A1    Mar. 30, 2023

(51) Int. Cl.
| | |
|---|---|
| *G08G 1/01* | (2006.01) |
| *B60W 30/16* | (2020.01) |
| *G01C 21/36* | (2006.01) |
| *G08G 1/052* | (2006.01) |
| *G08G 1/065* | (2006.01) |
| *G08G 1/0968* | (2006.01) |

(52) U.S. Cl.
CPC ....... *G08G 1/0145* (2013.01); *G01C 21/3691* (2013.01); *G08G 1/052* (2013.01); *G08G 1/065* (2013.01); *G08G 1/096805* (2013.01); *B60W 30/16* (2013.01); *B60W 2554/4042* (2020.02); *B60W 2554/4043* (2020.02); *B60W 2554/406* (2020.02); *B60W 2554/801* (2020.02); *B60W 2554/802* (2020.02)

(58) Field of Classification Search
CPC ........ B60K 31/18; B60K 35/00; B60K 35/22; B60K 35/29; B60K 2310/22; B60K 2360/182; B60K 2360/186; B60W 10/00; B60W 30/16; B60W 50/14; B60W 2050/146; G01C 21/3492; G01C 21/3676; G01C 21/3691; G08G 1/012; G08G 1/0129; G08G 1/0133; G08G 1/0137; G08G 1/0141; G08G 1/0145; G08G 1/052; G08G 1/065; G08G 1/096805; G08G 1/096811; G08G 1/096844; G08G 1/166

See application file for complete search history.

(56) References Cited

U.S. PATENT DOCUMENTS

| | | | |
|---|---|---|---|
| 2016/0171521 A1* | 6/2016 | Ramirez | G08G 1/096838 701/409 |
| 2016/0375768 A1* | 12/2016 | Konet | B60K 35/00 348/148 |
| 2017/0221149 A1* | 8/2017 | Hsu-Hoffman | G06Q 40/08 |
| 2020/0166897 A1* | 5/2020 | Campos | G06V 20/58 |
| 2021/0042844 A1* | 2/2021 | Potter | G08B 21/02 |

(Continued)

*Primary Examiner* — Peter D Nolan
*Assistant Examiner* — Ce Li Li
(74) *Attorney, Agent, or Firm* — Lorenz & Kopf LLP

(57) ABSTRACT

A method for determining a risk boundary in response to the plurality of indications of hard braking events wherein the risk boundary is indicative of a plurality of speed flow pairs at which a risk of a hard braking event is below a threshold value, determining, at a road segment level, a set of speed flow pairs of average speed and vehicle count and a plurality of indications of hard braking events, determining a host vehicle speed, and performing at least one of reducing the host vehicle speed and increasing a host vehicle following distance in response to the host vehicle speed exceeding the risk boundary for the vehicle flow density.

20 Claims, 5 Drawing Sheets

(56) References Cited

U.S. PATENT DOCUMENTS

| | | | |
|---|---|---|---|
| 2021/0164792 A1* | 6/2021 | Pal | G01C 21/3453 |
| 2021/0300354 A1* | 9/2021 | McGill | B60W 30/18154 |
| 2022/0034678 A1* | 2/2022 | Chintakindi | B60W 60/0051 |
| 2022/0276063 A1* | 9/2022 | Berman | G01C 21/3484 |
| 2023/0021813 A1* | 1/2023 | Downing | G08G 1/091 |
| 2023/0154327 A1* | 5/2023 | Huang | G08G 1/0133 |
| | | | 701/423 |
| 2024/0003697 A1* | 1/2024 | Berman | G01C 21/3492 |

* cited by examiner

TRAFFIC FLOW RISK PREDICTION AND MITIGATION

INTRODUCTION

The present disclosure relates generally to a system for predicting traffic flow disruption risk and providing traffic flow information to motor vehicles and infrastructure. More specifically, aspects of the present disclosure relate to systems, methods and devices for determining a traffic flow risk for a speed flow pair in response to a number of hard braking events associated with that speed flow pair in a roadway segment.

Hard braking events are an undesirable vehicle control event indicating that a stopping force of a vehicle has exceeded a threshold value. An example of a hard braking event may be when a vehicle speed decreases at a rate greater than seven miles per hour per second. The number of near braking events at a location may be indicative of an increased risk of vehicle to vehicle contact in that location or a disruption of traffic flow in that location. These hard braking events may be caused by driver inattention, debris on the roadway, dangerous or slippery road conditions, changes in lighting conditions, changes in vehicle flow pattern, stop and go traffic, construction or existing accidents. It has been shown that as the vehicle density increases in a roadway, the number of hard braking events also likely increase. Likewise, as average speed of the vehicles on the roadway increases, the number of hard braking events may increase.

Estimating a possibility of a high risk roadway or traffic situation may be difficult for drivers or fleet operators as the causes of these high risk events are highly dependent on ever changing traffic flow information. Traditional time of day estimates which estimate traffic flow risk in response to an average traffic flow risk at a particular time of day over many prior days do not take into account current conditions on the roadway segment. In addition, some drivers may be more risk tolerant than others for reduction in travel time or route preference. It would be desirable to provide an absolute traffic flow risk assessment for vehicle operators and infrastructure managers on a roadway while overcoming the aforementioned problems.

The above information disclosed in this background section is only for enhancement of understanding of the background of the invention and therefore it may contain information that does not form the prior art that is already known in this country to a person of ordinary skill in the art.

SUMMARY

Disclosed herein are vehicle sensor methods and systems and related control logic for provisioning vehicle systems, methods for making and methods for operating such systems, and motor vehicles equipped with onboard control systems. By way of example, and not limitation, there are presented various embodiments of systems for determining a real-time risk assessment for vehicle flow disruption in response to which maximizes a number of speed flow pairs and a number of hard braking incidents associated with each speed flow pair. This risk assessment may be provided to a driver, vehicle navigation system and infrastructure management system.

In accordance with an aspect of the present disclosure, an apparatus including a user interface configured to receive a driver risk tolerance in response to a user input, a receiver configured to receive a risk assessment for a roadway segment wherein the risk assessment is generated in response to a vehicle flow rate on the roadway segment, an average vehicle speed on the roadway segment and a plurality of hard braking events occurring within the roadway segment, and a vehicle controller configured to reduce a vehicle speed to a reduced vehicle speed in response to the risk assessment exceeding the driver risk tolerance.

In accordance with an aspect of the present disclosure, wherein the vehicle speed is reduced in response to an updated risk assessment matching the driver risk tolerance and wherein the updated risk assessment is determined in response to the vehicle flow rate on the roadway segment, the plurality of hard braking events occurring within the roadway segment, and the reduced vehicle speed.

In accordance with an aspect of the present disclosure, a memory for storing a plurality of risk assessments corresponding to a plurality of vehicle flow rate and average vehicle speed pairs.

In accordance with an aspect of the present disclosure, wherein the driver risk tolerance is determined in response to a prior driver behavior.

In accordance with an aspect of the present disclosure, a display for providing an indication of an increased following distance to a driver.

In accordance with an aspect of the present disclosure, wherein the vehicle controller is further operative to increase a following distance in response to the risk assessment exceeding the driver risk tolerance.

In accordance with an aspect of the present disclosure, wherein the risk assessment is proportional to a number of hard braking events occurring within the roadway segment during a preceding time interval.

In accordance with an aspect of the present disclosure, further including a navigation system for determining an alternate route in response to the risk assessment exceeding the driver risk tolerance.

In accordance with an aspect of the present disclosure, wherein the vehicle controller is configured to perform a lane change operation in response to the risk assessment exceeding the driver risk tolerance.

In accordance with an aspect of the present disclosure, a method including receiving a plurality of indications of hard braking events wherein each of the plurality of indications includes a location and a vehicle speed, determining a risk boundary in response to the plurality of indications of hard braking events wherein the risk boundary is indicative of a plurality of speed flow pairs at which a risk of a hard braking event is below a threshold value, determining a vehicle flow density for a roadway segment, determining a host vehicle speed, and performing at least one of reducing the host vehicle speed and increasing a host vehicle following distance in response to the host vehicle speed exceeding the risk boundary for the vehicle flow density.

In accordance with an aspect of the present disclosure, further including selecting an alternative navigational route in response to the risk boundary for the vehicle flow density.

In accordance with an aspect of the present disclosure, wherein the risk boundary is further determined in response to a user input.

In accordance with an aspect of the present disclosure, wherein the risk boundary is determined using a Greenshield Traffic Flow model.

In accordance with an aspect of the present disclosure, wherein the risk boundary is further determined in response to a third party risk management selection.

In accordance with another aspect of the present disclosure, generating an alternate navigational route in response to the host vehicle speed exceeding the risk boundary for the vehicle flow density.

In accordance with another aspect of the present disclosure, recommending a travel lane in response to the host vehicle speed exceeding the risk boundary for the vehicle flow density.

In accordance with another aspect of the present disclosure, performing a host vehicle lane change operation in response to the host vehicle speed exceeding the risk boundary for the vehicle flow density.

In accordance with another aspect of the present disclosure, providing a driver alert to a host vehicle driver in response to the host vehicle speed exceeding the risk boundary for the vehicle flow density.

In accordance with another aspect of the present disclosure, wherein the risk boundary is determined in response to a probability of a hard braking occurrence within the roadway segment for a speed flow pair.

A In accordance with another aspect of the present disclosure, an advanced driver-assistance system including receiving, via a user interface, a driver risk tolerance, determining, by a processor, a risk assessment for a roadway segment wherein the risk assessment is generated in response to a vehicle flow rate on the roadway segment, an average vehicle speed on the roadway segment and a plurality of hard braking events occurring within the roadway segment, and reducing a vehicle speed in response to the risk assessment exceeding the driver risk tolerance.

In accordance with another aspect of the present disclosure, increasing a vehicle following distance in response to the risk assessment exceeding the driver risk tolerance.

The above advantage and other advantages and features of the present disclosure will be apparent from the following detailed description of the preferred embodiments when taken in connection with the accompanying drawings.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Hard braking events are often used as a surrogate measure for road performance and/or driver performance. For example, commercial drivers with multiple hard braking event occurrences may be considered higher risk that commercial drivers without hard braking event occurrences. Higher risk drivers may then be identified as candidates for additional training to reduce risky driving behavior. Hard braking events may further be indicative of disruptive traffic flow or risky traffic situations, such as construction zones, locations of disabled vehicles, or locations of emergency services personnel. It may be desirable for a driver or advanced driver-assistance system (ADAS) equipped vehicle controller to adjust a navigational route or vehicle parameters, such as speed or following distance, in order to reduce potential risk.

Figure 1:
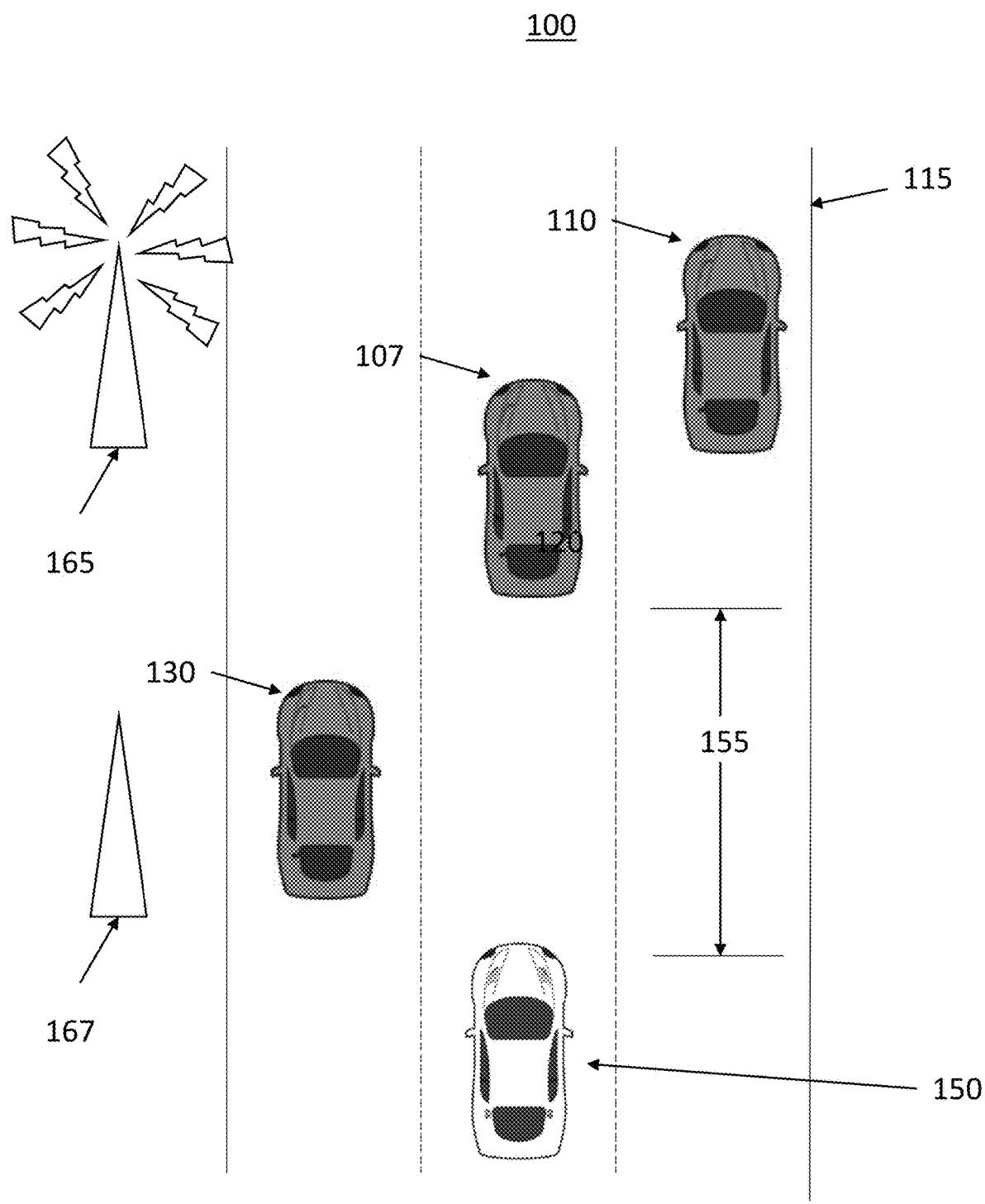
FIG. 1 shows an exemplary environment for use of the traffic flow risk prediction according to an exemplary embodiment of the present disclosure.

In an exemplary embodiment, data indicative of hard braking events is collected by an infrastructure management system, vehicle control systems, crowdsourcing, or the like. A risk threshold boundary is then generated in response to an acceptable level of risk to a driver or infrastructure manager. The threshold boundary is a maximum vehicle speed at a particular traffic flow density at which the risk is at the acceptable level of risk. If the vehicle is expected to exceed the threshold boundary at an upcoming location, a driver or ADAS may decide to reduce the vehicle speed, increase the following distance to the preceding vehicle, and/or choose an alternate route. In the case of an exemplary traffic flow management system, a speed limit approaching the upcoming location may be lowered and/or warning signs activated to lower the risk to an acceptable level. Additionally, access on controlled access roadways may be limited to reduce the vehicle flow on the roadway segment Turning now to FIG. 1, an exemplary environment 100 of a vehicle having a traffic flow risk prediction system according to an exemplary embodiment of the present disclosure is shown. The exemplary environment 100 depicts a section of multilane road surface 115, a roadside communications unit 165, a first vehicle 110, a second vehicle 107, a third vehicle 130, and a host vehicle 150. In this exemplary embodiment, the distance between the second vehicle 107 and the host vehicle 150 is the following distance 155.

The exemplary system is first configured to detect a plurality of hard braking events within the section of the multilane road surface 115. In some exemplary embodiments the length of the section is five hundred meters. Hard braking events may be detected by one or more of the plurality of vehicles 110, 107, 130, 150 and transmitted to the roadside communications unit 165 or other wireless network to a processing center or the like. An initial speed at which each hard braking event started and a vehicle density for each of the hard braking events may also detected and stored with the hard braking event. The speed and location of each of the plurality of vehicles 110, 107, 130, 150 may also transmitted from each of the plurality of vehicles 110, 107, 130, 150 to the roadside communications unit 165. Alternatively, hard braking events and the speed and location of the of the plurality of vehicle may be detected via an alternate device such as, a roadside traffic flow detection device 167, or may be transmitted from a mobile device within one or more of the plurality of vehicles 110, 107, 130, 150. The roadside traffic flow detection device 167 may employ roadway pressure sensors, imaging technology, radar, lidar, infrared detection or other remote sensing technology to detect the location and speed of the plurality of vehicles 110, 107, 130, 150.

Figure 2:
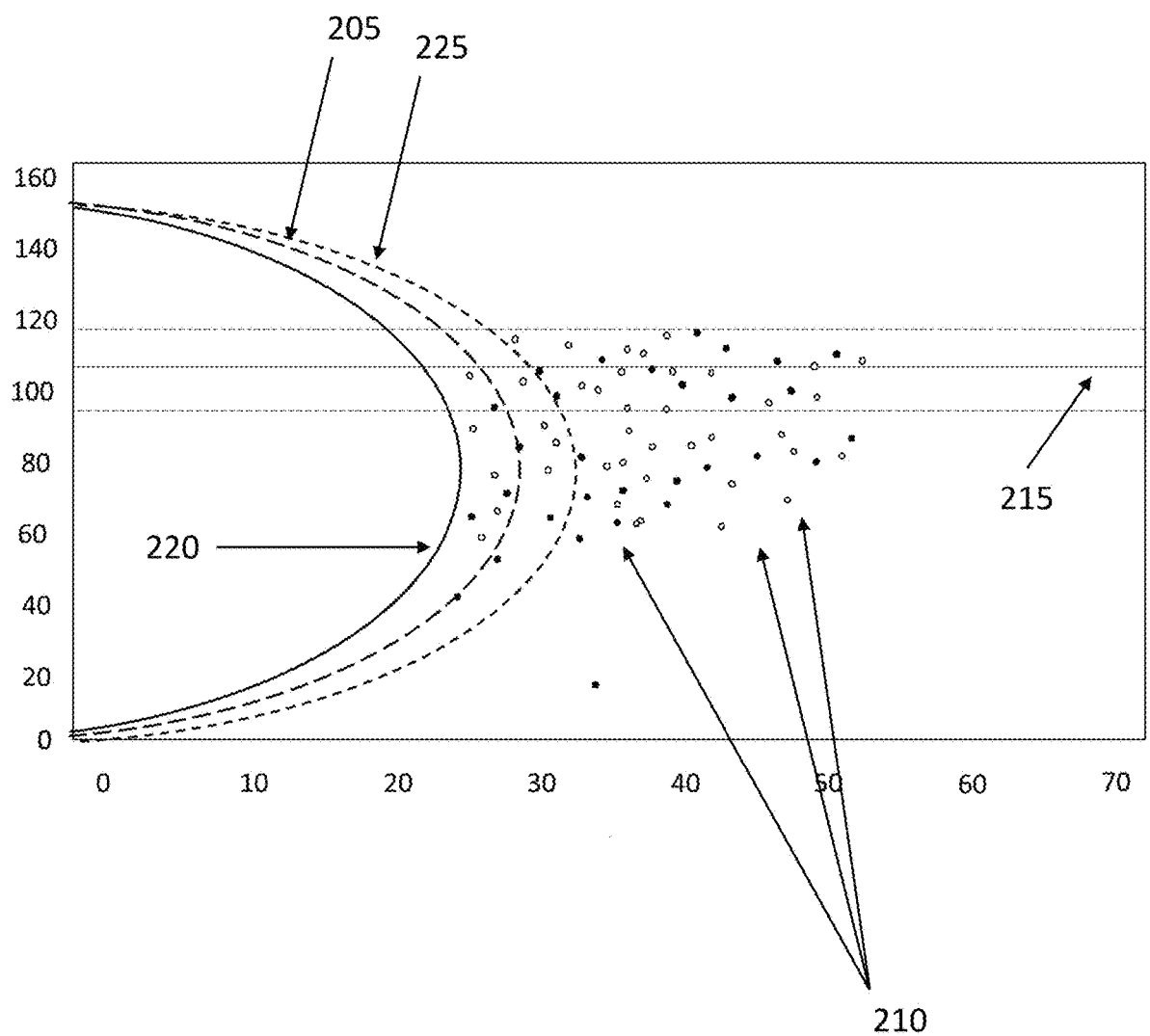
FIG. 2 shows an exemplary graphical representation of an absolute minimum boundary and a plurality of indications of collections of hard braking events according to an exemplary embodiment of the present disclosure.

The exemplary system is next operative to generate a speed flow boundary which excludes the collection of hard braking collections while maximizing the number of speed flow pairs having a number of hard braking events below a threshold number. In some exemplary embodiments, the boundary may be generated using a Greenshield traffic flow model and adjusting the flow and/or density such that the boundary is lower than the speed flow pairs having a number of hard braking events above a threshold number. FIG. 2 shows a graphical representation 200 of an absolute minimum boundary 220 and a plurality of indications 210 of collections of hard braking events. The speed limit 215 for the roadway is further indicated. The graphical representation is further indicative of additional boundaries 205, 225 with higher than absolute minimum boundaries. These additional boundaries may be indicative of higher disruptive risks. For example, the absolute minimum boundary 220 may be indicative of free traffic flow or minimal risk driving environment. The second boundary 205 may be indicative of synchronized free flow & low risk to traffic stream and the third boundary 225 may be indicative of a higher traffic flow with increasing disruption risk.

The exemplary system combines established traffic flow theory with connected vehicle telemetry to assess road performance per road segment. This gathered information can be useful to enable road safety performance of a road network in real time based on connected vehicle data. Traffic engineers and/or infrastructure managers may notify road users using dynamic message signs or notify vehicle drivers to inform them about the current road environment.

In some exemplary embodiments, vehicle flow may be measured by unique vehicle count in the traffic stream on a road segment in a specific time period. The value may be assumed to be proportional to the actual vehicle flow. Using the Greenshield Traffic Flow model in a novel way, an optimized speed flow boundary may be generated to minimize the collection of hard braking events (10 or more) within the boundary. The boundary is used to determine how many vehicles should be in the vehicle stream at any given speed in order to minimize disruption risk. The degree to which vehicle counts exceed the minimized value determines the risk due to traffic volume at a given speed. The density of hard braking events is used to identify the minimized absolute risk boundary. Once identified, the boundary may be used to assess vehicle spacing risk based upon the average speed and vehicle counts observed in samples from the spatial temporal frame.

The exemplary system and method may be used for controlling a relation between a vehicle and traffic flow over a road segment and for determining the property of a road segment based on connected vehicle data, established road profile data and road segment deviation from road profile. In addition, the system may be used as an input for navigation of a vehicle based on (i) selecting an alternate route for the vehicle (ii) recommending a target lane or making a lane change for a vehicle, (iii) change a headway dynamic for the vehicle, (iv) changing the speed of a vehicle, (v) changing the speed profile of the vehicle.

Figure 3:
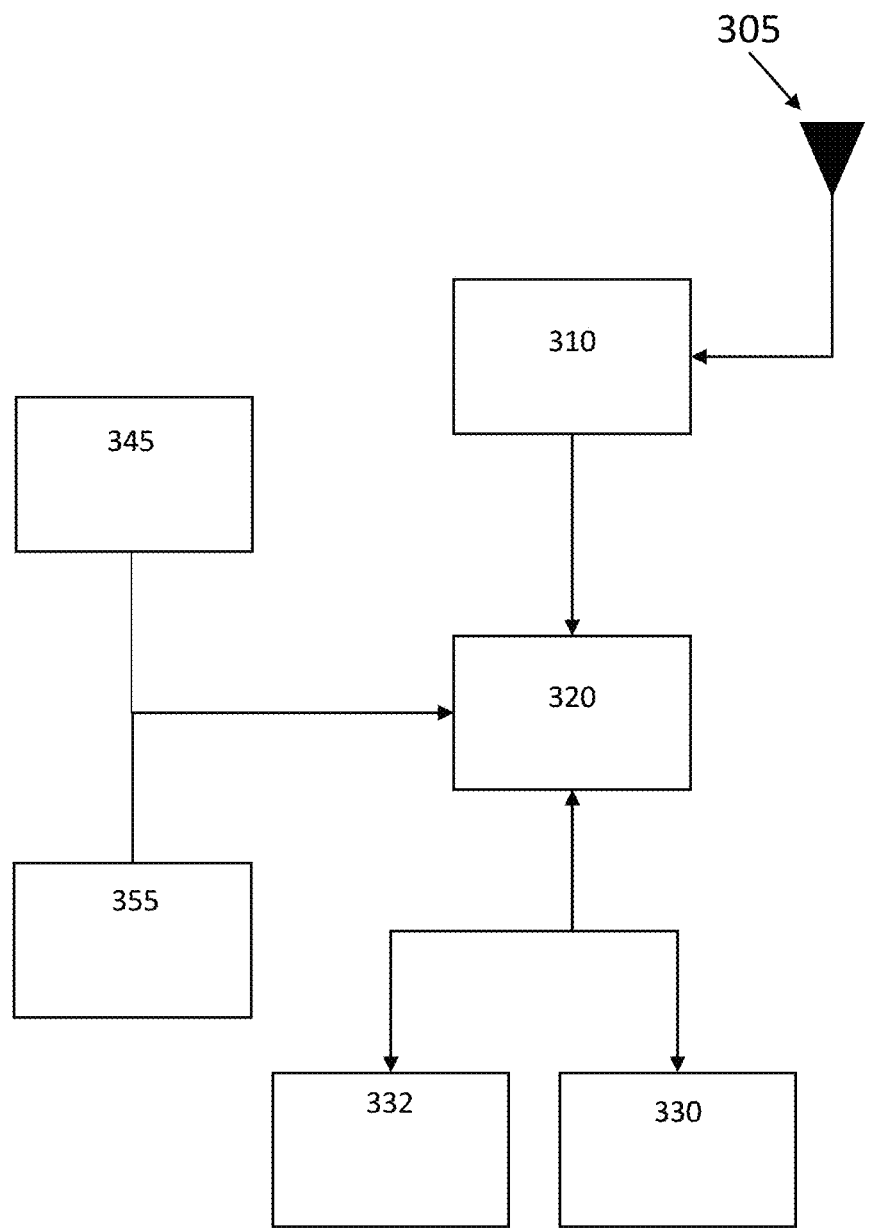
FIG. 3 shows a block diagram illustrating a system for traffic flow risk prediction in a motor vehicle according to an exemplary embodiment of the present disclosure.

Turning now to FIG. 3, a block diagram illustrating a system 300 for implementing the method for traffic flow risk prediction according to an exemplary embodiment of the present disclosure is shown. The exemplary system 300 may include an antenna 305, a receiver 310, a processor 320, a driver information center 330, a vehicle controller 332, a camera 355 and an object detection system 345.

The antenna 305 is configured to receive an electromagnetic signal including data via a wireless network communications channel, such as a broadband cellular network, vehicle to infrastructure (V2I) communications, vehicle to vehicle (V2V), vehicle to everything (V2X) or other wireless data transmission network. The data may carry data related to hard braking events within a roadway segment. In some exemplary embodiments, the data may be a lookup table, or the like, indicative of a number of hard braking events associated with a speed flow pair. Alternatively, the exemplary lookup table may include a traffic flow risk for a plurality of speed flow pairs. The traffic flow risk for each speed flow pair may be determined in response to a number of hard braking events within the roadway segment at a particular average speed and traffic flow volume. In some exemplary embodiments, different traffic flow risks for different times, dates, and/or seasons, may be provided for each of the plurality of speed flow pairs. The antenna 305 is communicatively coupled to a receiver 310.

The receiver 310 may be configured to receive the electromagnetic signal from the antenna 305 and to demodulate the electromagnetic signal to extract a baseband signal and to decode the baseband signal to extract the data. For example, a 5G cellular signal has carrier modulation frequencies of about 28 GHz and 39 GHz. 5G data may be further encoded using orthogonal frequency-division multiplexing (OFDM). The extracted data may then be coupled to the processor 320.

The processor 320 is operative to receive the demodulated and decoded data from the receiver 310. The processor 320 next employs the received data to determine a traffic flow risk for an upcoming roadway segment. The processor is further operative to receive a host vehicle speed from a vehicle sensor, such as a vehicle controller 332 or a GPS and a host vehicle following distance for the host vehicle from an object detection system 345. The object detection system 345 may be a lidar, radar, ultrasonic, light emitting diode (LED) or other sensor configured to determine a distance between the host vehicle and a preceding vehicle within the roadway lane. Alternatively, the following distance may be estimated in response to an image captured by a host vehicle camera 355. The following distance may also be determined in response to V2I communications wherein the infrastructure is operative to transmit vehicle locations, speeds, and the like, including the speed and location of the host vehicle and the preceding vehicle.

The processor 320 is next configured to determine a traffic flow risk for the upcoming roadway segment in response to the host vehicle speed and the host vehicle following distance. The host vehicle speed and the host vehicle distance may be used to select the applicable speed flow pair and associated traffic flow risk. The processor 320 then compares this traffic flow risk with a risk threshold. The risk threshold may be determined in response to a user input, a user behavior, and/or a defined threshold. A defined threshold may be established by a fleet management entity, infrastructure management, or other third party. The user input may be received via the driver information center 330 or other user input. The user behavior may be estimated from prior driver responses to similar traffic flow risk situations. For example, data indicative of an increase in following distance and/or reduction in speed may be received from the vehicle controller in response to a prior traffic flow risk situation.

If the traffic flow risk exceeds the risk threshold, the processor 320 is then configured to generate a control signal for transmission to the vehicle controller 332 in order to reduce the traffic flow risk for the host vehicle. The control signal may be indicative of a request for a lower host vehicle speed or an increased following distance. Alternatively, the processor 320 may be configured to determining an alternate route for the host vehicle to avoid the upcoming roadway segment. Alternatively, the processor 320 may be configured to display a recommended host vehicle speed or increased following distance to a driver via the driver information center 330 or other user input.

Figure 4:
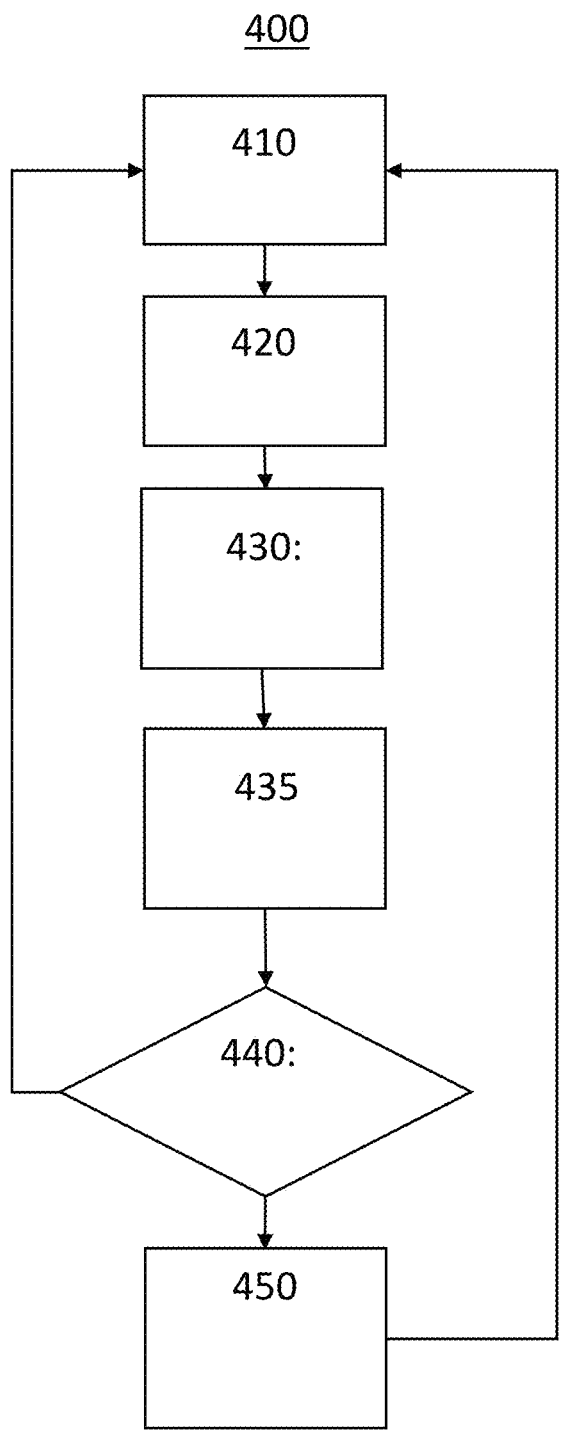
FIG. 4 shows a flow chart illustrating an exemplary method for traffic flow risk prediction according to an exemplary embodiment of the present disclosure.

Turning now to FIG. 4, a flow chart illustrating an exemplary method 400 for implementing the traffic flow risk prediction within a roadway segment according to an exemplary embodiment of the present disclosure is shown. The exemplary method is first operative to receive 410 a plurality of indications of hard braking events within the roadway segment. Each of the plurality of indications of hard braking events may include an initial speed of the of the vehicle before the hard braking event, the location of the vehicle during the hard braking event and a time of the hard braking event. Each of the plurality of indications of hard braking events may further include a traffic flow density at the time of the hard braking event. If no traffic flow density is included with the indication, the method may then be operative to determine a traffic flow density for the road segment at the time of the hard braking event or otherwise retrieve the traffic flow density at the time of the hard braking event. The traffic flow density may be determined in response to proximate infrastructure detection devices, crowdsourced data, or in response to other available methods.

In some exemplary embodiments, a traffic flow risk table may be received by the host vehicle via wireless communications system or the like in lieu of the reception of individual indications of hard braking events. The traffic flow risk table may provide a traffic flow risk for each of a plurality of speed flow pairs. This traffic flow risk table may be generated by an infrastructure server or the like which receives the information related to the plurality of hard braking events and generates the table. The traffic flow risk table may then be transmitted to various vehicles and other infrastructure management devices.

The method is next operative to associate 420 a traffic flow risk with each of the plurality of speed flow pairs. A speed flow pair is a rate of flow in vehicles per minute for a particular average vehicle speed within the roadway segment. In response to the plurality of hard braking events for each speed flow pair, the method generates a traffic flow risk. In some exemplary embodiments, the number of hard braking events associated with a speed flow pair is proportional to the traffic flow risk. For example, there may be more hard braking events associated with a high speed, high vehicle density situation than either a low density high speed, or high density low speed situation. Additionally, a traffic flow risk may be determined in response to a linear regression of observations of hard braking events between proximate speed flow pairs.

The method next determines 430 a host vehicle speed and following distance. The host vehicle speed and following distance may be determined in response to data from a host vehicle controller and host vehicle sensors, such as a speedometer, lidar and/or global positioning system (GPS). Following distance is inversely proportional to traffic rate of flow. The greater the average following distance between vehicles, the lower the number of vehicles within the roadway segment for at a given time.

A traffic flow risk associated with the host vehicle speed and following distance is next determined 435 and compared 440 to a risk threshold. The risk threshold may be determined in response to a user input, a user behavior, and/or a defined threshold. A defined threshold may be established by a fleet management entity, infrastructure management, or other third party. If the traffic flow risk does not exceed the risk threshold, the host vehicle continues at the current host vehicle speed and following distance.

If the traffic flow risk associated with the current vehicle speed and following distance exceeds the threshold, the method is next configured to mitigate 450 the risk to an acceptable level. To mitigate the risk, the driver or ADAS may reduce at least one of the host vehicle speed and the following distance. In general, reducing the host vehicle speed or increasing the following distance, thereby decreasing the apparent traffic rate of flow, reduces the traffic flow risk. The method may reduce the vehicle speed and/or increase the following distance until the current traffic flow risk is less than or equal to the threshold. Alternatively, the method may select an alternate route to avoid the traffic flow risk at the upcoming roadway segment.

Figure 5:
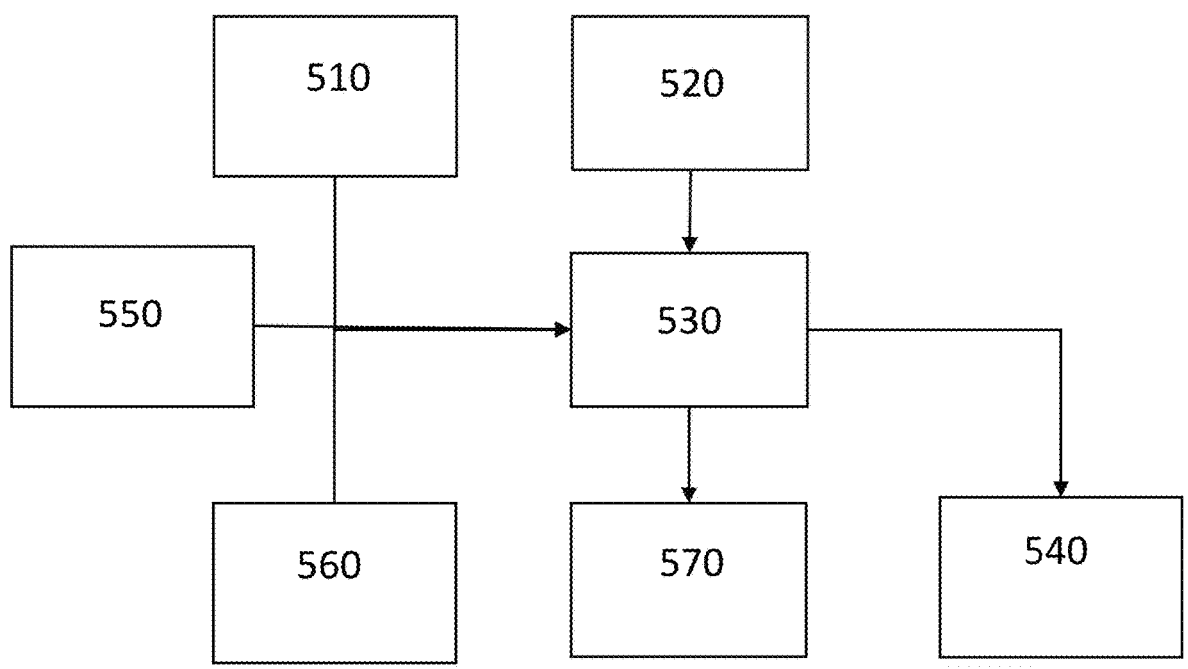
FIG. 5 shows another block diagram illustrating a system for the traffic flow risk prediction in an infrastructure according to an exemplary embodiment of the present disclosure.

Turning now to FIG. 5, a block diagram of a system 500 for traffic flow risk infrastructure management according to an exemplary embodiment of the present disclosure is shown. The exemplary system 500 may include a receiver 520, a transmitter 570 a display 540, a processor 530, an object detection system 550 a camera 510 and a memory 560. The exemplary system 500 may form a portion of an infrastructure management system for controlling traffic flow on a roadway segment.

The system 500 may first be configured to receive a plurality of indications of hard braking events within the roadway segment. These indications may be received, via the receiver 520, from vehicles travelling on the roadway segment. The indications may be transmitted via a V2X communications network or the like. The indications may be indicative of a time and date of a hard braking event, an initial vehicle speed and an event location. The processor 530 may then be configured to determine a traffic flow risk within the roadway segment in response to the plurality of indications of hard braking events. The traffic flow risk may be calculated for a plurality of speed flow pairs. These traffic flow risks may be stored in a memory 560 communicatively coupled to the processor 530.

The processor 530 is next configured to determine a current vehicle flow volume and an average vehicle speed on the roadway segment. The current vehicle flow volume and the average vehicle speed may be determined in response to crowdsourced data from individual vehicles or vehicle occupants, from data captured via the object detection system 550 and/or from image processing algorithms performed on images captured by the camera 510.

The processor 530 is next configured to compare the current vehicle flow volume and the average vehicle speed on the roadway segment to the traffic flow risk for that speed flow pair. If the traffic flow risk exceeds a threshold risk value, the processor 530 may next determine a suitable reduction in average vehicle speed and/or vehicle flow volume which would meet or be lower than the threshold risk value. In some exemplary embodiments, the processor 530 may then couple this reduced vehicle speed to a display 540, such as a variable speed limit sign, before and/or along the roadway segment. A vehicle following distance associated with vehicle flow volume of the reduced risk value may be displayed on a programmable message board or traffic sign in order to provide drivers with the suggested increased following distance. Alternatively, the reduced vehicle speed and/or following distance may be provided directly to the vehicles approaching the roadway segment via V2I communications, for use by the driver and/or ADAS systems.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An apparatus comprising:
a user interface configured to receive a driver risk tolerance in response to a user input, wherein the driver risk tolerance is user defined via the user input in a driver information center;
a receiver configured to receive a data indicative of a plurality of hard braking events wherein each of the plurality of hard braking events is associated with one of a plurality of vehicle speed flow pairs;
a processor for determining a risk assessment in response to a host vehicle speed, a host vehicle following distance, and the plurality of hard braking events, wherein the risk assessment is determined in response to a speed flow boundary and wherein the speed flow boundary excludes a first portion of the plurality of speed flow pairs having a number of hard braking events above a threshold number and includes a second portion of the plurality of speed flow pairs having a number of hard braking events below a threshold number;
a user interface for displaying at least one of a reduced vehicle speed and an increased following distance in response to the risk assessment exceeding the driver risk tolerance; and
a vehicle controller configured to reduce a vehicle speed to a reduced vehicle speed in response to the risk assessment exceeding the driver risk tolerance.

2. The apparatus of claim 1, wherein the vehicle speed is reduced in response to an updated risk assessment matching the driver risk tolerance and wherein the updated risk assessment is determined in response to the vehicle flow rate on the roadway segment, the plurality of hard braking events occurring within the roadway segment, and the reduced vehicle speed.

3. The apparatus of claim 1, further comprising a memory for storing a plurality of risk assessments corresponding to a plurality of vehicle flow rate and average vehicle speed pairs.

4. The apparatus of claim 1, wherein the driver risk tolerance is determined in response to a prior driver behavior.

5. The apparatus of claim 1, further comprising a display for providing an indication of an increased following distance to a driver.

6. The apparatus of claim 1, wherein the vehicle controller is further operative to increase a following distance in response to the risk assessment exceeding the driver risk tolerance and wherein the threshold number is ten.

7. The apparatus of claim 1, wherein the risk assessment is a functional relationship between an average speed and vehicle flow relative to a number of hard braking events occurring within the roadway segment during a preceding time interval.

8. The apparatus of claim 1, further including a navigation system for determining an alternate route in response to the risk assessment exceeding the driver risk tolerance.

9. The apparatus of claim 1, wherein the vehicle controller is configured to perform a lane change operation in response to the risk assessment exceeding the driver risk tolerance.

10. A method performed by an advanced driver-assistance system comprising:
receiving, via a user interface, a driver risk tolerance in response to a user input, wherein the driver risk tolerance is user defined via the user input in a driver information center;
receiving, by a receiver, a data indicative of a plurality of hard braking events wherein each of the plurality of hard braking events is associated with one of a plurality of vehicle speed flow pairs;
determining, by a processor, a risk assessment for a roadway segment wherein the risk assessment is generated in response to a host vehicle speed, a host vehicle following distance a vehicle flow rate on the roadway segment, an average vehicle speed on the roadway segment and the plurality of hard braking events wherein the risk assessment is determined in response to a speed flow boundary and wherein the speed flow boundary excludes a first portion of the plurality of speed flow pairs having a number of hard braking events above a threshold number and includes a second portion of the plurality of speed flow pairs having a number of hard braking events below a threshold number; and
reducing a vehicle speed in response to the risk assessment exceeding the driver risk tolerance.

11. The method performed by the advanced driver-assistance system of claim 10, further including increasing a vehicle following distance in response to the risk assessment exceeding the driver risk tolerance.

12. A method comprising:
receiving, via a user interface, a driver risk tolerance in response to a user input, wherein the driver risk tolerance is user defined via the user input in a driver information center;
receiving a data indicative of a plurality of hard braking events wherein each of the plurality of hard braking events is associated with a vehicle speed flow pair;
determining a risk boundary in response to the plurality of hard braking events wherein the risk boundary is indicative of a plurality of speed flow pairs at which a risk of a hard braking event is below a threshold value;
determining a vehicle flow density for a roadway segment;
determining a host vehicle speed; and
performing at least one of reducing the host vehicle speed and increasing a host vehicle following distance in response to the host vehicle speed exceeding the risk boundary for the vehicle flow density.

13. The method of claim 12, further including selecting an alternative navigational route in response to the risk boundary for the vehicle flow density.

14. The method of claim 12, wherein the risk boundary is further determined in response to the user input.

15. The method of claim 12, wherein the risk boundary is determined using a Greenshield Traffic Flow model.

16. The method of claim 12, wherein the risk boundary is further determined in response to a third party risk management selection.

17. The method of claim 12, further including generating an alternate navigational route in response to the host vehicle speed exceeding the risk boundary for the vehicle flow density.

18. The method of claim 12, further including performing a host vehicle lane change operation in response to the host vehicle speed exceeding the risk boundary for the vehicle flow density.

19. The method of claim 12, further including providing a driver alert to a host vehicle driver in response to the host vehicle speed exceeding the risk boundary for the vehicle flow density.

20. The method of claim 12, wherein the risk boundary is determined in response to a probability of a hard braking occurrence within the roadway segment for a speed flow pair.

* * * * *